United States Patent [19]

Hudson

[11] Patent Number: 4,610,783
[45] Date of Patent: Sep. 9, 1986

[54] CONTROL OF ALGAE IN RE-CIRCULATING WATER SYSTEMS

[76] Inventor: Paul Hudson, 416 Claircrest Ave., Mississauga, Ontario, Canada, L5A 1T6

[21] Appl. No.: 705,359

[22] Filed: Feb. 22, 1985

Related U.S. Application Data

[63] Continuation-in-part of Ser. No. 545,527, Oct. 26, 1983, abandoned.

[30] Foreign Application Priority Data

Nov. 4, 1982 [CA] Canada .................................. 414853

[51] Int. Cl.$^4$ ............................ C02F 1/50; A61L 2/16
[52] U.S. Cl. .................................. 210/169; 210/198.1; 210/416.2; 210/446; 210/501; 422/29
[58] Field of Search ............... 210/155, 162, 167, 169, 210/198.1, 323.2, 416.1, 416.2, 435, 446, 501, 764; 71/67; 422/29; 137/268

[56] References Cited

U.S. PATENT DOCUMENTS

| | | | |
|---|---|---|---|
| 174,532 | 3/1876 | Hulbert | 210/335 |
| 1,988,246 | 7/1929 | Krause | 99/15 |
| 2,734,028 | 2/1956 | Domogalla | 210/764 X |
| 3,479,130 | 11/1969 | Rapaport | 422/29 X |
| 3,494,727 | 2/1970 | Rapaport | 422/29 X |
| 3,974,071 | 8/1976 | Dunn et al. | 210/501 X |
| 4,202,858 | 5/1980 | Bruce et al. | 422/29 X |
| 4,416,854 | 11/1983 | Nielsen | 210/764 X |
| 4,504,387 | 3/1985 | LeMire et al. | 210/416.2 X |

*Primary Examiner*—Benoit Castel
*Assistant Examiner*—W. Gary Jones
*Attorney, Agent, or Firm*—Donald E. Hewson

[57] ABSTRACT

In a swimming pool, or other open-to-sunlight water system, algae is controlled, as disclosed, by ionisation from a single metal, i.e., zinc. The zinc is mounted in a jacket that is built into the pipework of the pool, as a plurality of metallic zinc discs mounted in a plastic jacket or sleeve which is inserted into one of the circulation pipes for the pool. The sleeve is mounted to the pipe by pipe-to-sleeve adapters at each end thereof.

6 Claims, 5 Drawing Figures

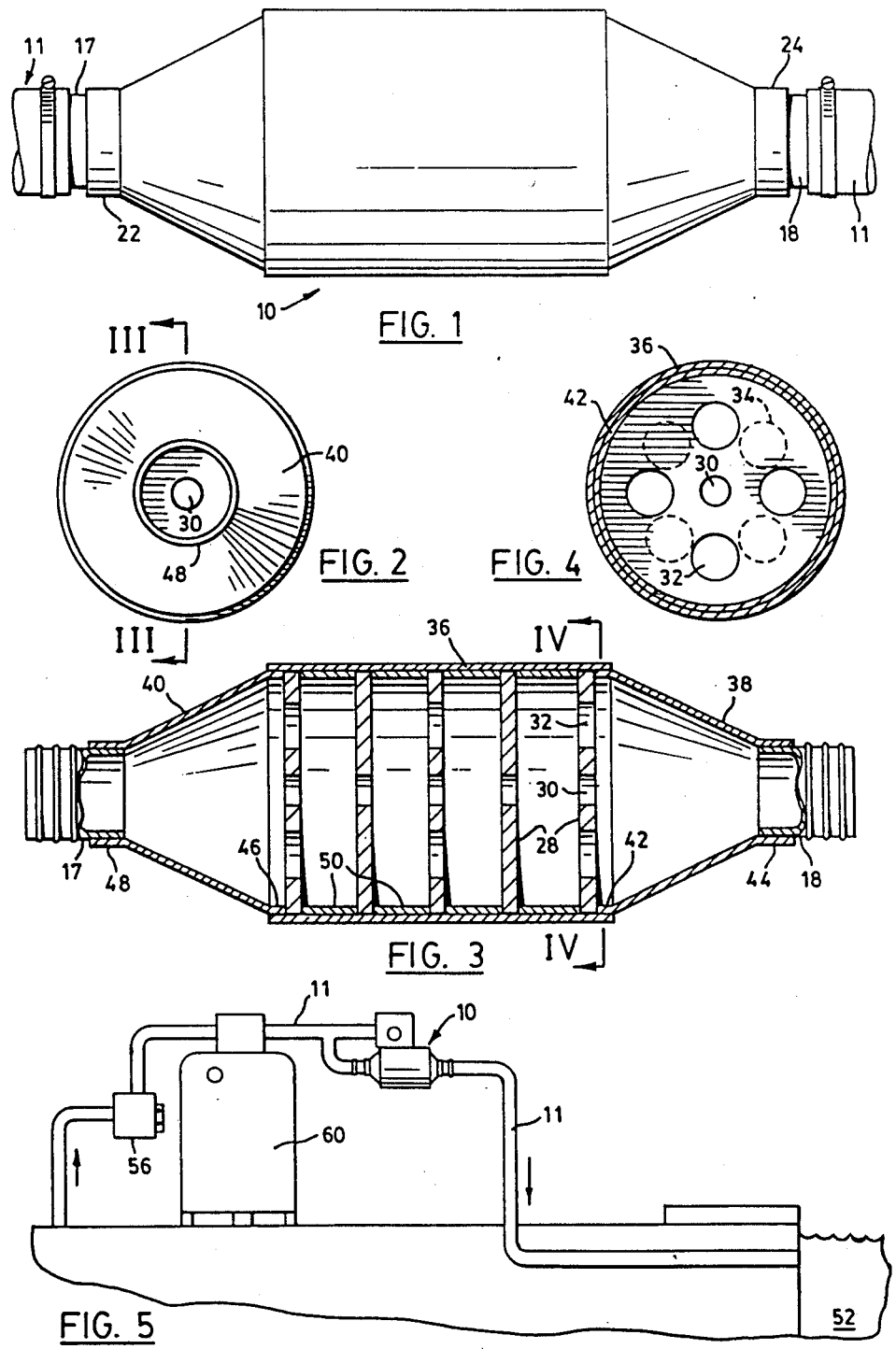

CONTROL OF ALGAE IN RE-CIRCULATING WATER SYSTEMS

This application is a continuation-in-part of application Ser. No. 545,527, filed Oct. 26, 1983, now abandoned.

This invention relates to the protection of water systems from algae.

Any water system where the water surface is exposed to the atmosphere and to sunlight tends to attract algae. A swimming pool is a familiar example. A swimming pool will turn green from algae in a matter of days if steps are not taken to control the algae.

Algae can be controlled with chlorine. The chlorine that is put into swimming pools to control bacteria from people using the pool also serves to control the algae. But chlorine quickly evaporates from the pool, especially on a hot and sunny day, so that frequent checking and topping-up are required. Apart from the expense of the chlorine, most people find it unpleasant.

However, the amount of chlorine needed to control the bateria is quite small compared with the amount needed to control the algae. Hence, if the algae can be controlled in some other way, less chlorine (for example, half) is needed in the swimming pool.

PRIOR ART

U.S. Pat. No. 4,416,854 (NIELSEN, Nov. 22, 1983) teaches that a container chips of copper and zinc, when immersed in a swimming pool, will control algae. Contact with the water causes an electrolytic reaction between the different metal chips in the container. The ions of the two (or more) metals co-operate to effectively kill algae, even at very low, safe concentrations of each kind of metal ion. NIELSEN mentions that just one metal on its own produces ions that have a biocidal effect, but that two metals, with their electrolytic action, are required if the concentrations are to be kept safely low.

GENERAL DESCRIPTION OF THE INVENTION

It is recognized in the present invention that the algae-controlling effect of just one metal on its own can after all be strong enough. In the invention, the metal is placed not in the pool itself where the water is substantially static, but in the feed pipe of the circulating system, where the water is flowing. The water is caused to tumble and swirl over the metal, which leads to a sufficient concentration of metallic ions in the water to control the algae.

If on simply immerses a container of a single metal in the pool water, only the local area near the container remains algae-free. Placing the metal in the pipe turns out to have the unexpected effect that all the water is adequately treated.

In the invention, the metal is zinc. Copper would work also, but it is too expensive, and copper has a tendency to leave discolorations on the pool materials.

In the invention, there is no electrolytic effect. This is an advantage because the electrolytic effect tends to cause corrosion in steel fittings over which the water passes, such as those of the pump and filtration equipment. If there should be any tendency to electrolytic action in the water, the zinc will tend to be sacrificed, thus protecting other metals such as the steel of the pool fitments.

In the invention, it is essential that the zinc be placed not in the tank where the water moves only imperceptibly, but in a section of pipe where the water moves bodily, i.e. in bulk, with a rapid volume flow rate.

In the invention, the zinc is contained in a jacket, which is arranged to replace a section of the pipe.

A specific construction of the jacket will be discussed below, but in general the construction of the jacket should be such as to locate the zinc properly. Mere pellets of zinc resting in the jacket would not be acceptable when the water is flowing through the jacket because it would be difficult to prevent the pellets from either clogging the jacket, or escaping from the jacket. The zinc and the jacket should not give rise to any increased resistance to the flow of water. On the other hand, the zinc must be well-exposed to the water that flows through the jacket.

The jacket is made of plastic; the preferred plastic is PVC, because:

(a) PVC has been found acceptable for pools and other tanks for many years;

(b) PVC is relatively low-priced;

(c) PVC easy to work, i.e. to mould, extrude, and cut;

(d) PVC will not corrode with any of the chemicals normally thrown into pools and tanks;

(e) It is easy to make strong structural joints using glue, with PVC;

(f) A glued PVC joint can be made watertight and pressure tight, with little requirement for quality control.

DETAILED DESCRIPTION OF PREFERRED EMBODIMENT

The accompanying drawings illustrate a water-recirculation system, in this case a swimming pool, which incorporates the algae-controlling means of the invention.

FIG. 1 is a side elevation of a jacket;

FIG. 2 is an end elevation of the jacket of FIG. 1;

FIG. 3 is a cross-section on line 3—3 of FIG. 2;

FIG. 4 is a cross-section on line 4—4 of FIG. 3;

FIG. 5 is a diagrammatic view of the water circuit.

The re-circulation system shown in the drawings is that of a swimming pool, and includes a jacket 10 which is installed in, and as part of, a pipe 11.

The jacket 10 comprises a right-cylindrical sleeve 36, and two sleeve-to-pipe adapters 38,40. Inside the jacket 10 are a number of discs 28 of zinc, mounted co-axially with the sleeve 36, and these discs 28 are spaced apart by means of annular spacers 50.

To assemble the discs 28 into the jacket 10, the discs and spacers 50 are built as a stack, and inserted in the sleeve 36 between the adapters 38,40. The adapters 38,40 are glued to the sleeve 36. The adapters 38,40 include spigots 42,46, which are a snug fit in the sleeve 36 for this purpose.

To assemble the stack, the discs 28 are formed with respective central holes 30, and a tie rod is passed through these holes 30 to clamp the assembly together while the glue sets. The tie rod is then removed.

The sleeve 36, the adapters 38,40, and the spacers 50, are all made of PVC plastic, which is easy to join with glue in the manner described.

The jacket 10 when manufactured in the manner just described can be low in cost, and yet the jacket 10 is robust, both during installation and service. The spacers 50 are not themselves glued in, nor are the discs 28, yet all the components are firmly secured and cannot become dislodged or detached when the water starts to flow, or at any time. The jacket 10 is out of sight, and poses no hazard for swimmers.

The discs 28 have water-flow holes 32,34, which may be staggered as shown in FIG. 4 to ensure that the water churns into and over the discs 28. The holes should be large enough that the water-flow resistance of the discs 28 is no greater than that of the pipe 11.

The system includes a screen 56 and a pump and filter unit 60, in addition to the body of water 52 in the pool itself.

The pipe 11 in some systems is rigid. To install the jacket 10, it is a simple task to cut out a section of pipe and glue the jacket 10 in its place. Spigots 44,48 on the respective adapters 38,40 are sized to accommodate the standard size of rigid pipe.

Step-down or step-up inserts could be provided for use with pipes of other sizes.

Ridged inserts 17,18 can be used with flexible pipes, as shown in FIGS. 1 and 3.

When installed in the pipe 11, the jacket is fully sealed and enclosed. All the water contained in the re-circulation system at some stage flows into the inlet 22 and out of the outlet 24 of the jacket 10.

The zinc being in disc form is of a preferred shape because flat discs are easy to cast. However, the zinc could be in some other form or shape; the requirement is that the zinc is held firmly in the jacket so that the zinc does not interfere with the through-flow of water, does not become dislodged by the flowing water, presents a good surface of zinc to the water, and causes the water to tumble and churn as it passes over the zinc.

I claim:

1. A water re-circulation system comprising:
   an open tank, which contains a body of water, which is open to sunlight and to the atmosphere;
   feed and return pipes connected to the tank;
   where the system is arranged so that the water, when in the tank, moves only imperceptibly during re-circulation, but the water, when in the pipes, moves at a rapid bulk volume flow rate during re-circulation;
   a plastic jacket;
   where the jacket is installed in and as part of one of the pipes and comprises a cylindrical sleeve of larger diameter than the pipe, each end of said jacket being connected to the pipe by a pipe-to-sleeve adapter which is a snug fit to the sleeve;
   where the jacket has means defining an inlet and means defining an outlet connected into the said one of the pipes to accommodate the whole through-flow of water in the said one of the pipes;
   where the jacket, apart from the inlet and outlet, is enlosed and sealed and capable of sustaining an internal water pressure;
   substantially pure metallic zinc;
   where the zinc is mounted in the jacket as a plurality of discs which are disposed co-axially with the sleeve so as to be well-exposed to the water that flows through the jacket;
   where the discs are located in the sleeve by virtue of their being trapped therein between the two adapters;
   and where the jacket contains substantially no other metal than zinc exposed to the flow of water through the jacket.

2. System of claim 1, where the discs are separated from each other by spacers which are made of plastic and are of annular shape.

3. System of claim 2, where the discs are provided with holes to permit the flow of water, and where the aggregate area of the holes in each disc is no less than the area of the said one of the pipes.

4. System of claim 3, where the discs and holes are so orientated that the flowing water follows a tortuous path to ensure full contact of the water with the zinc discs.

5. System of claim 1, where the tank is a swimming pool.

6. System of claim 5, where the system includes a pump unit and a filter unit and where the said one of the pipes in which the jacket is installed is the feed pipe between those units and the pool.

* * * * *